(12) United States Patent
Kuznecov et al.

(10) Patent No.: US 11,473,440 B2
(45) Date of Patent: Oct. 18, 2022

(54) GAS TURBINE STATOR

(71) Applicant: JOINT-STOCK COMPANY "UNITED ENGINE CORPORATION", Moscow (RU)

(72) Inventors: Valerij Alekseevich Kuznecov, g. Perm' (RU); Vladimir Konstantinovich Sychev, g. Perm' (RU); Vladimir Mihajlovich Yazev, g. Perm' (RU)

(73) Assignee: JOINT-STOCK COMPANY UNITED ENGINE CORPORATION, Moscow (RU)

( * ) Notice: Subject to any disclaimer, the term of this patent is extended or adjusted under 35 U.S.C. 154(b) by 40 days.

(21) Appl. No.: 16/754,033

(22) PCT Filed: Oct. 3, 2018

(86) PCT No.: PCT/RU2018/000643
§ 371 (c)(1),
(2) Date: Apr. 6, 2020

(87) PCT Pub. No.: WO2019/070157
PCT Pub. Date: Apr. 11, 2019

(65) Prior Publication Data
US 2021/0363895 A1 Nov. 25, 2021

(30) Foreign Application Priority Data
Oct. 5, 2017 (RU) .......................... RU2017135493

(51) Int. Cl.
*F01D 25/24* (2006.01)
*F01D 11/12* (2006.01)
*F01D 9/04* (2006.01)

(52) U.S. Cl.
CPC .............. *F01D 11/127* (2013.01); *F01D 9/04* (2013.01); *F01D 25/246* (2013.01); *F05D 2240/11* (2013.01); *F05D 2250/232* (2013.01); *F05D 2250/283* (2013.01)

(58) Field of Classification Search
CPC ...... F01D 11/00; F01D 11/127; F01D 11/001; F01D 11/08; F01D 25/24; F01D 25/243; F01D 9/04
See application file for complete search history.

(56) References Cited

U.S. PATENT DOCUMENTS

| | | | |
|---|---|---|---|
| 7,334,984 B1 * | 2/2008 | Stine | F01D 11/127 415/173.1 |
| 2004/0213666 A1 * | 10/2004 | Gieg | F01D 25/246 415/170.1 |

* cited by examiner

*Primary Examiner* — David E Sosnowski
*Assistant Examiner* — Maxime M Adjagbe
(74) *Attorney, Agent, or Firm* — PATENTTM.US

(57) ABSTRACT

The invention is related to the gas turbine stators of the gas turbine engines applied in aviation. The gas turbine stator, in the outer housing of which sectors of the split honeycomb ring (made as double-layer one) are installed with support elements on the front and rear axial ends of the sector. In this invention, the layer of the sector facing the outer housing is made U-shaped in the plane, the support elements are made as separate rotary bodies distributed uniformly along the circumference and the front support elements (on the gas flow direction) are larger than rear ones in terms of geometrical dimensions by factor 1.1 . . . 1.5. Therefore, the implementation of the invention proposed with the characteristic features above, in conjunction with the known features of the invention claimed enables reduction of the gas turbine stator weight and improvement its reliability without compromising the turbine efficiency.

2 Claims, 3 Drawing Sheets

GAS TURBINE STATOR

CROSS-REFERENCE TO RELATED APPLICATIONS

This application is a national phase entry of PCT/RU2018/000643, filed Oct. 3, 2018, which claims priority of RU application 2017135493, filed Oct. 5, 20217.

STATEMENT REGARDING FEDERALLY SPONSORED RESEARCH OR DEVELOPMENT

Not Applicable

The Names of the Parties to a Joint Research Agreement

Not Applicable

Incorporation-by-Reference of Material Submitted on a Compact Disc or as a Text File Via the Office Electronic Filing System (EFS-WEB)
Not Applicable

STATEMENT REGARDING PRIOR DISCLOSURES BY THE INVENTOR OR A JOINT INVENTOR

Not Applicable

BACKGROUND OF THE INVENTION

Field of the Invention

The invention is related to the gas turbine stators of the gas turbine engines applied in aviation.
Description of Related Art including information disclosed under 37 CFR 1.97 and 1.98

The prior art disclose gas turbine stator including an outer housing of the turbine as well as sectoral split honeycomb ring made of the sheet material layers with the front (on the gas flow) part of the sector is single-layer, the sector central part—double-layer and the rear part of the sector—partially three-layer (Patent RU 2534669, IPC F01D 25/24 published on Dec. 10, 2014). The disadvantage of this design is its heavy weight.

The closest to the claimed invention is the stator of the gas turbine, in the outer housing of which sectors of the split honeycomb ring, made as double-layer ones, with support elements on the front and rear axial ends of the sector (Patent RU 25343333, IPC F01D 25/24 published on Nov. 27, 2014).

The disadvantage of the known design used as the prototype is its heavy weight which compromises the characteristics of the aircraft gas turbine engine.

BRIEF SUMMARY OF THE INVENTION

The technical problem solved by the invention consists in the reliability improvement without compromising the turbine efficiency and reduction of the gas turbine stator weight.

The essence of the technical solution consists in the fact that in the gas turbine stator, in the outer housing of which sectors of the split honeycomb ring (made as double-layer one) with support elements on the front and rear axial ends of the sector, in accordance with the invention, the layer of the sector facing the outer housing is made U-shaped in the plane, the support elements are made as separate rotary bodies distributed uniformly along the circumference and the front support elements (on the gas flow direction) are larger than rear ones in terms of geometrical dimensions by factor 1.1 . . . 1.5.

Besides, in accordance with the invention, the support elements are made as truncated cones.

Making the layer of the honeycomb sector facing the turbine housing U-shaped in the plane enables substantial reduction of the weight of the sector and gas turbine stator in general, without increasing the gas spurious leaks on the sector outer side.

Making the support elements as separate rotary bodies uniformly located along the circumference enables the minimization of the support elements' weight and combine the weight minimization with the high reliability of the design.

Making the support elements as truncated cones enables increasing the surface area for the solid coupling (for example, welding or soldering) of the support element with the honeycomb sector root which improves the reliability of the sector and gas turbine stator.

Making the front (along the gas flow direction) support elements larger than the rear ones in terms of geometrical dimensions by factor 1.1 . . . 1.5 improves the reliability of the honeycomb sector because front support elements fix the lock ring of the front nozzle blade in the radial direction and are located in the zone of higher temperatures than the rear ones, the redial load on which is equal to the weight of the honeycomb ring sector only.

At the geometric dimensions ratio <1.1 the weight of the support elements and honeycomb sector increases; at the geometric dimensions ratio >1.5 the reliability of the honeycomb sector reduces due to the excessive reduction of the geometrical dimensions of the rear support elements.

DETAILED DESCRIPTION OF THE INVENTION

Figure 1:
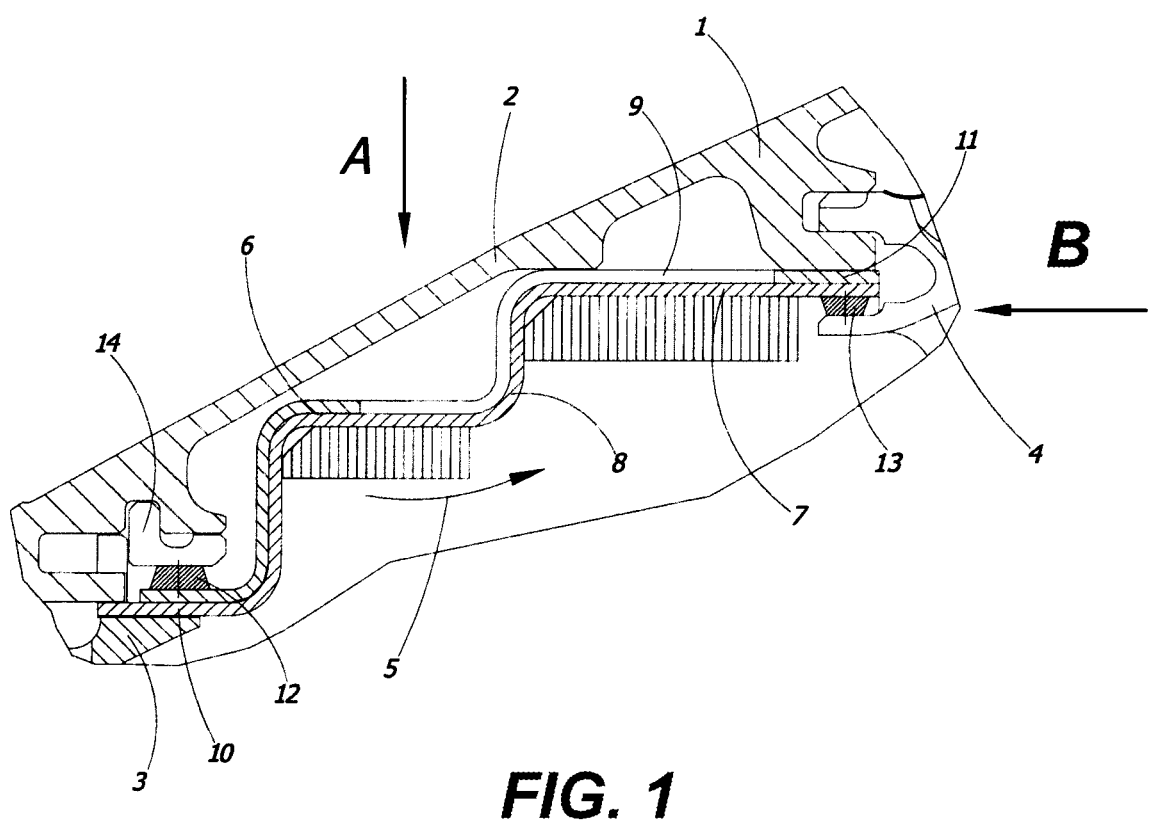
FIG. 1 shows longitudinal cross-section of the gas turbine stator.
Figure 2:
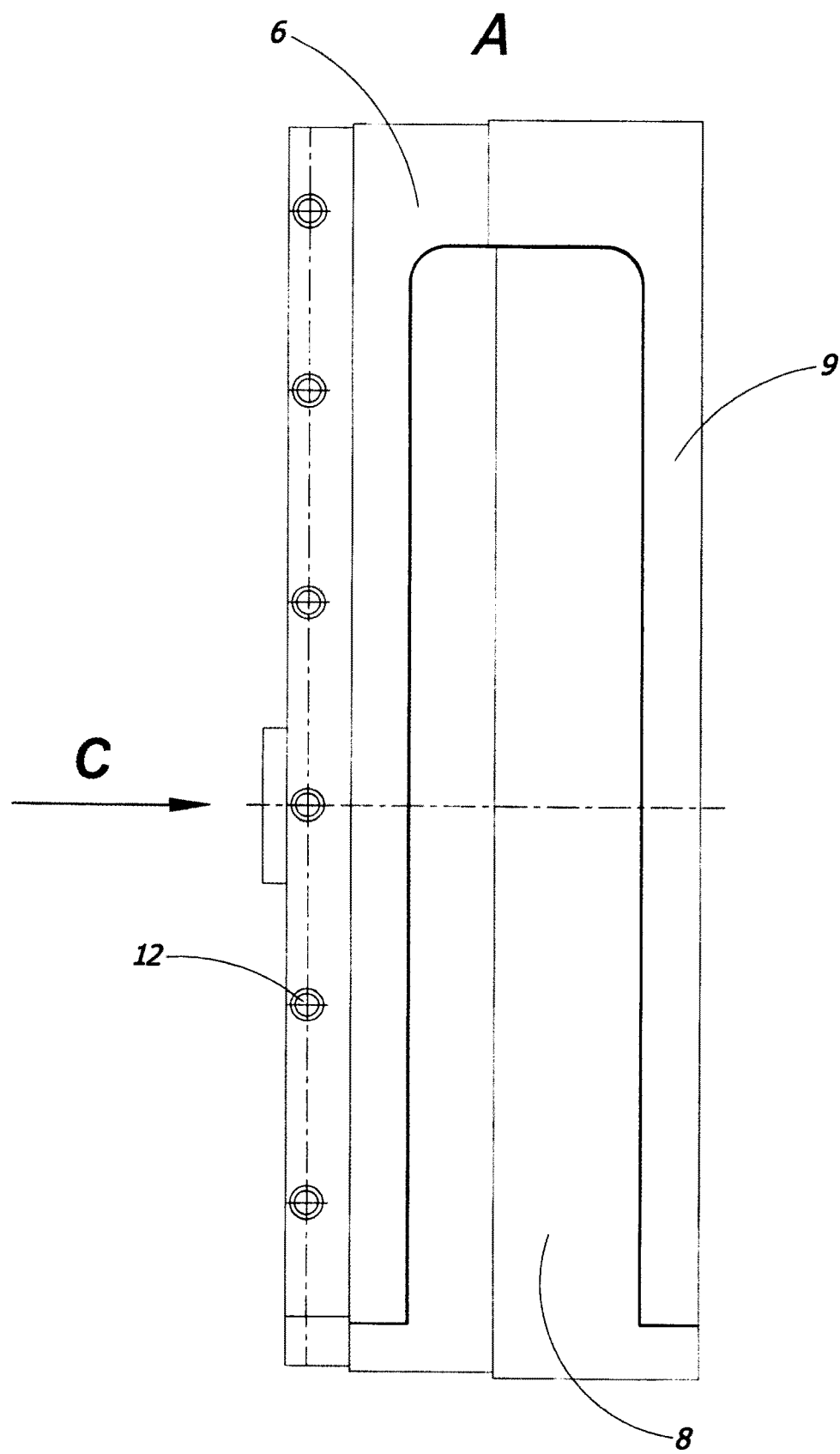
FIG. 2 shows View A of FIG. 1.
Figure 3:
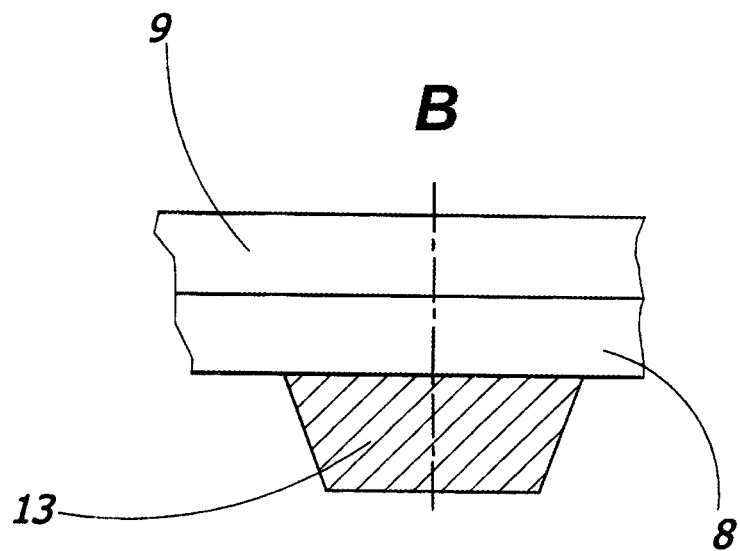
FIG. 3—View B of FIG. 1.
Figure 4:
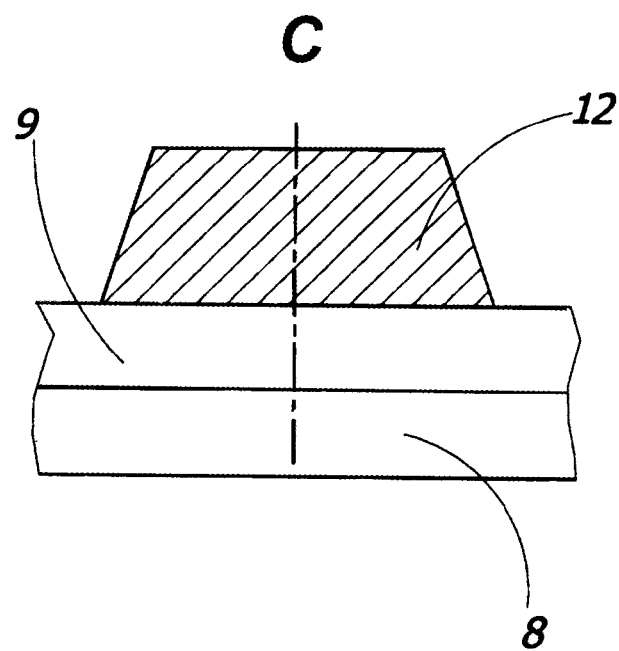
FIG. 4—View C of FIG. 2.

Stator 1 of the gas turbine includes outer housing 2 in which sectors 6 of the split honeycomb ring 7 are installed between the front 3 and rear 4 nozzle blades along the gas 5 stream. Sectors 6 are made of metal sheets in two layers, with the inner layer 8 solid and the outer layer 9 facing the outer housing 2 is made U-shaped in the plane. On the front 10 and rear 11 ends of the sector 6 front 12 and rear 13 support elements made as rotation bodies (for example, truncated cones) located uniformly along the circumference are installed. The front support elements 12 lock the lock ring 14 against radial displacement for which reason they are made 1.1 . . . 1.5 times larger (in terms of the geometric dimensions) than the rear support elements 13 which take up the load only of the sector 6 itself. The geometric similarity of the support elements 12 and 13 enables their fabrication cost reduction.

This device operates as follows.

During the operation the high-temperature gas stream 5 flows inside the stator 1 of the gas turbine; in case of the contact with the stream the outer housing 2 of the stator 1 could be damaged. However, it does not occur because sectors 6 of the split honeycomb ring 7 reliably prevent the outer housing 2 from the contact with the gas stream 5 at the minimum weight of the sectors 6. Hereby, the front 10 and rear 11 ends of the sector 6 are double-layered and with the front and rear support elements 12 and 13 which improves the reliability of locking of the sectors 6 in the front and rear nozzle blades 3 and 4.

Therefore, the implementation of the proposed invention with the characteristic features above, in conjunction with the known features of the invention claimed enable reducing the weight of the stator of the gas turbine and improving the reliability without compromising the turbine efficiency.

The invention claimed is:

1. A gas turbine stator in an outer housing of which sectors of a split honeycomb ring are installed; the split honeycomb ring is made as a double-layer, with support elements on front and rear axial ends of the sectors characterized in the fact that a layer of the sectors facing the housing is made U-shaped in a plane, the support elements are made as separate rotary bodies distributed uniformly along a circumference defined by the sectors and the support elements on the front axial end are larger than the support elements on the rear axial end in terms of geometrical dimensions by factor 1.1 . . . 1.5.

2. Gas turbine stator as per claim 1 characterized in the fact that the support elements are made as truncated cones.

* * * * *